United States Patent [19]

Staal et al.

[11] Patent Number: 4,627,076
[45] Date of Patent: Dec. 2, 1986

[54] LOW POWER DIGITAL BUS

[75] Inventors: Philip R. Staal; Richard C. Hughes; John H. Olsen, all of Dartmouth, Canada

[73] Assignee: Her Majesty the Queen in right of Canada, as represented by the Minister of National Defence of Her Majesty's Canadian Government, Ottawa, Canada

[21] Appl. No.: 776,186

[22] Filed: Sep. 13, 1985

Related U.S. Application Data

[63] Continuation of Ser. No. 463,759, Feb. 4, 1983, abandoned.

[30] Foreign Application Priority Data

Feb. 24, 1982 [CA] Canada ................................ 396950

[51] Int. Cl.[4] .......................... H04B 3/00; H04L 25/00
[52] U.S. Cl. .......................................... 375/36; 333/12; 379/398; 379/417
[58] Field of Search ...................... 375/17, 36; 333/12, 333/243, 236, 1; 179/170 J; 174/36, 72 R, 78, 88 R, 88 C, 88 S, 103, 105 R, 106 R, 113 R, 107

[56] References Cited

U.S. PATENT DOCUMENTS

| | | | |
|---|---|---|---|
| 311,174 | 1/1885 | Clark | 174/105 R |
| 3,290,653 | 12/1966 | Slattery et al. | 375/36 |
| 3,302,035 | 1/1967 | Greene | 375/36 |
| 3,390,357 | 6/1968 | Thomson | 174/103 |
| 3,582,576 | 6/1971 | Karbowiak | 179/170 J |
| 3,622,683 | 11/1974 | Roberts | 174/103 |
| 3,651,243 | 3/1972 | Hornor et al. | 174/103 |
| 3,671,671 | 6/1972 | Watanabe | 375/36 |
| 3,843,829 | 10/1974 | Bridges et al. | 174/103 |
| 4,077,022 | 2/1978 | Pitts, Jr. | 333/12 |
| 4,109,117 | 8/1978 | Wrench, Jr. et al. | 375/36 |
| 4,264,940 | 4/1981 | Castle | 333/12 |
| 4,341,927 | 7/1982 | Shinoi et al. | 375/36 |
| 4,376,920 | 3/1983 | Smith | 333/12 |
| 4,443,882 | 4/1984 | Rolfe et al. | 375/36 |

Primary Examiner—Benedict V. Safourek
Assistant Examiner—Stephen Chin
Attorney, Agent, or Firm—Sheldon Kanars; Jeremiah G. Murray; Edward Goldberg

[57] ABSTRACT

A digital data transmission system eliminates the need for coaxial cable or twisted pairs as a means to eliminate noise, interference or cross talk problems. The system utilizes a multi-conductor cable having a plurality of lays of insulated conductors surrounded by an electrically conductive shield. The shield serves as a common ground and one conductor in each lay provides a reference line for that lay. Data is transmitted over lines in at least one lay, the lines for transmitting data being terminated at each cable end by their characteristic impedances with respect to the shield.

8 Claims, 2 Drawing Figures

LOW POWER DIGITAL BUS

This application is a continuation of application Ser. No. 463,759, filed Feb. 4, 1983, now abandoned.

BACKGROUND OF THE INVENTION

1. Field of the Invention

This invention relates to a system for transmitting digital data with low cross talk.

2. Description of the Prior Art

In certain applications, it is desirable to transfer data, commands and power among many modules along a cable which may be hundreds of meters in length. This must be done with low power, with a date rate of, for example, up to 12 megabits per second, and with as low a cost as possible. For example, studying sound propagation in shallow water may require an array of in-line hydrophones, with electronics connected by robust and interchangeable cable sections, which cable sections form a digital bus, controlled at one end by a microprocessor, which in turn is controlled via radio link by a shipboard computer. Through such a system, many array characteristics including gain, bandpass, sampling rate and element acivity are easily changed by the operator. Obviously, in such an application, the cable must be robust to enable the array of hydrophones to be deployed and recovered by letting out and winding in the cable. An ordinary data bus with parallel conductors arranged in a common plane is not useable in such an application. Coaxial cables, twisted wire pairs and optical fibers can be used in conjunction with single conductors but this requires expensive, complicated cables, and usually serialized data paths dedicated to each link. Drive circuits may be complicated and power consuming. Some present systems use analog data transfer, which limits dynamic range and accuracy, and often requires a twisted wire or coaxial cable path for each data link. This leads to large cables for large numbers of modules. One current design uses a coaxial cable with frequency-multiplexed analog data and command transfer. This has a simple cable, but it is analog and has limited controlability and limited data rate.

SUMMARY OF THE INVENTION

The primary object of the present invention is to employ a simple multi-conductor cable in a manner similar to that of a digital computer bus. The invention is particularly useful in underwater systems but not limited to such.

In the present invention, some conductors of the cable may be used for power transfer, some for control, and some for data. The outer shield is used as a common ground. Cross talk problems, which at first sight would seem to make successful data transfer difficult or even impossible, have been eliminated by using one line in each lay of the cable as a reference for that lay, and proper choice of signal lines. Lines in different lays have different characteristic impedances with respect to the shield and these are matched at the extreme cable ends. Power lines may be connected directly from power source to power sink. All other lines are terminated in their characteristic impedances at the cable ends. The central pair of wires may be a differentially-driven twisted pair.

According to a broad aspect of the invention, there is provided a system of transmitting signals in the form of digital data with low crosstalk by means of a multi-conductor cable having a plurality of lays of insulated conductors surrounded by an electrically conductive shield. The shield is used as a common ground and one conductor in each lay is used as a reference line for that lay, with data transmitted over lines in at least one lay, the lines for transmitting data being terminated at each cable end by their characteristic impedances with respect to the shield.

The invention will now be further described in conjunction with the accompanying drawings.

DESCRIPTION OF THE PREFERRED EMBODIMENT

Figure 1:
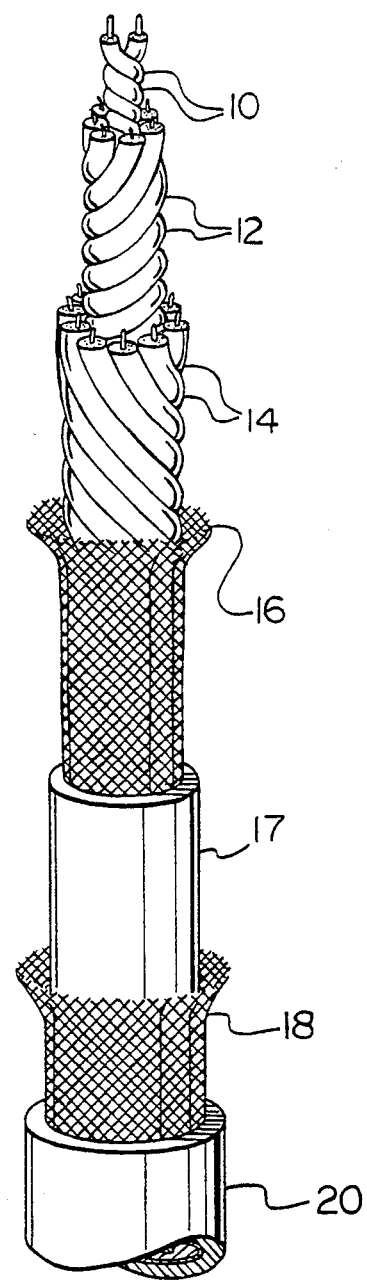
FIG. 1 is a diagram of a multi-conductor cable which may be used in practicing the present invention.

The cable shown in FIG. 1 represents an example of one that may be used in the present invention, but the invention is not limited to this particular type of cable. Cables having fewer or more conductors might be used, depending on the particular application.

In FIG. 1, the cable is seen to comprise two insulated inner conductors 10, eight insulated conductors 12 in a first lay, fourteen insulated conductors 14 in a second lay and a braided copper outer shield or screen 16. The shield is covered by an inner neoprene jacket 17, a stainless steel-armour/strength member 18 which is tortionally balanced, and an outer neoprene jacket 20.

In a practical application, the conductors 10 may be used for conducting signals such as clock pulses. One conductor 12 of the first lay may be selected as a reference conductor and the other conductors may be used for power transfer and for control lines. In the outer lay, one conductor 14 is selected as a reference conductor, two others may be used for power transfer and the other conductors may be used for data transfer.

A total of four conductors may be used for power transfer, eight for control signals, and twelve for data signals. The outer shield 16 is used as a common ground. The central twisted pair for the cable (conductors 10) is differentially driven by a master clock. The eight conductors 12 in the middle lay provide power lines, control lines and one reference line for the related conductors in this lay. The fourteen wires in the outer layer are used for data lines, and power lines, with one as a reference for twelve data lines.

Figure 2:
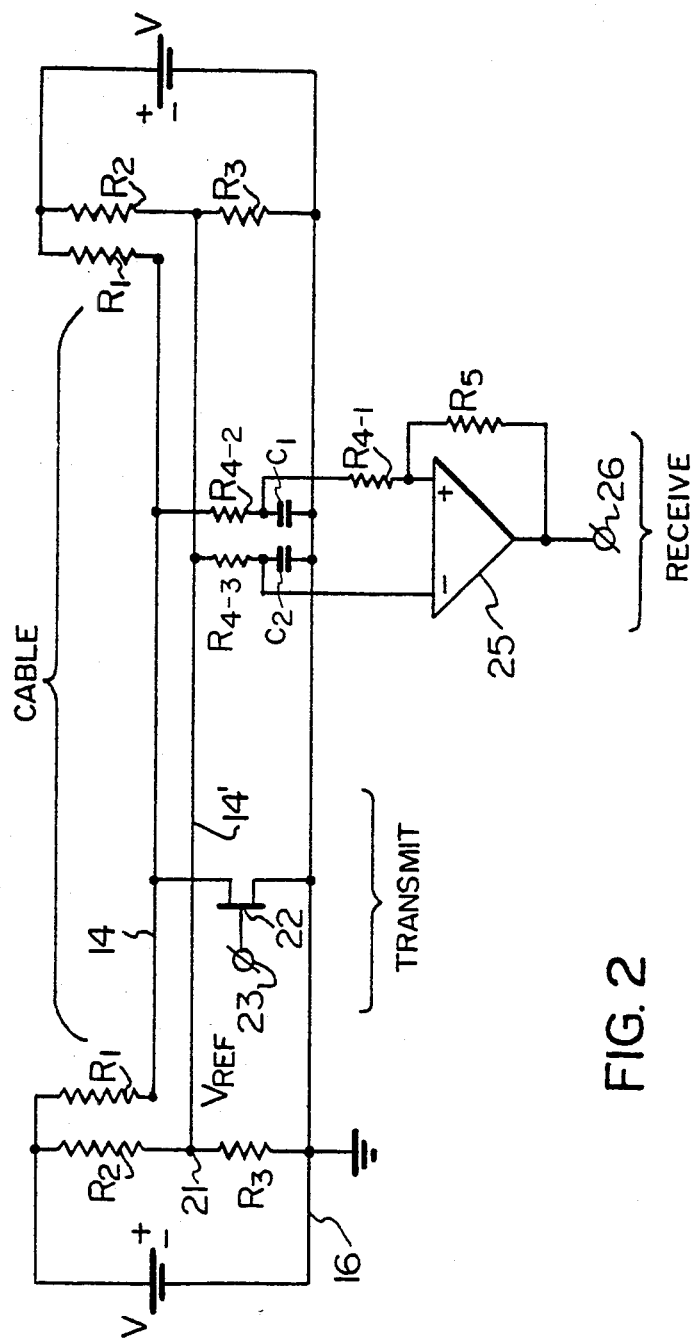
FIG. 2 is a schematic circuit diagram illustrating electrical connections of a data line and reference line with respect to ground.

FIG. 2 illustrates a circuit for connection of a typical data line for transmission and reception of data. A line 14 is connected at each end via a resistor $R_1$ to a voltage source V, the other side of which is connected to the grounded shield 16. A reference conductor 14' is connected to a tap 21 between voltage divider resistors $R_2$ and $R_3$ connected across voltage source V.

Data transmission is effected by turning a FET 22 on and off by applying pulses to its input terminal 23 (gate terminal). The voltage on line 14 varies with respect to the reference voltage on line 14', depending on whether the FET 22 is conducting or not. These changes in voltage are differentially detected by a receiver comprising a differential amplifier 25 having one input connected via a first resistor $R_{4-1}$ to a junction between a second resistor $R_{4-2}$ and a capacitor $C_1$ connected between line 14 and ground 16 and the other input connected to a junction between another resistor $R_{4-3}$ and capacitor $C_2$ connected between reference line 14' and ground 16. The output is taken at terminal 26.

Resistor $R_1$ is selected to be substantially equal to the characteristic impedance of the cable between line 14 and ground 16. The value of $R_2$ and $R_3$, in parallel, is also equal to the characteristic impedance of the cable. $R_2/R_3$ is determined by the ratio of FET "on" resistance to $R_1$.

The resistances $R_4$ are selected to be much greater than $R_1$.

The maximum data rate is set by the time constant $R_4C$. Resistor $R_5$, connected between the one input and the output of amplifier 25, sets the hysteresis of the receiver.

Similar circuits to that shown in FIG. 2 can be provided for each of a plurality of lines 14, so that the cable can readily carry parallel digital data, e.g. twelve parallel bits. A like circuit would also be applicable for connection of conductors 12 used as control lines in the middle layer with one conductor providing another reference.

What is claimed is:

1. A system for transmitting signals with low crosstalk through multi-conductor cable comprising:
a plurality of coaxial lays of insulated conductor lines including at least one inner lay and one outer lay, each lay including a plurality of separate conductor lines, each separate conductor line of each lay being individually insulated from each other conductor line of the respective lay, an electrically conductive coaxial shield surrounding said plurality of lays and providing a common shield and ground for said plurality of lays and conductor lines, all conductor lines within said shield being insulated from said shield and ground, one conductor line in one of said lays providing a signal reference line for said one lay separate from said common ground, first and second like sources of direct voltage connected at respective opposite ends of said conductor lines of said one lay, each said voltage source being connected between ground and respective conductor lines in said one lay and including a voltage divider connected across each said voltage source, each said divider having a tap providing a reference voltage connected to the respective end of said reference line, means for transmitting signals over other conductor lines in said one lay including switching means connected between respective other signal transmitting conductor lines and ground for varying the voltage on said other conductor lines with respect to said reference line voltage, and means for terminating said signal transmitting lines at each end of said cable with the characteristic impedance of the respective line with respect to said shield.

2. The system claimed in claim 1 wherein said voltage source is connected between ground and a conductor line in said one lay, and including a voltage divider connected across said switching means is a field effect transistor connected between the conductor line and ground.

3. The system as claimed in claim 1 wherein said means for terminating said signal transmitting lines includes a first resistor having a resistance value equal to the characteristic impedance of said line with respect to the shield connected between the respective ends of each other conductor line and each voltage source.

4. The system in claim 3 wherein said voltage dividers comprise second and third resistors having said tap therebetween, the parallel equivalent resistance value of said second and third resistors being substantially equal to the characteristic impedance of said line with respect to the shield.

5. The system of claim 2 including signal receiving means differentially detecting voltage changes between said conductor line and said reference line with respect to the shield.

6. The system of claim 5 including a first series resistor connected between said conductor line and a first input terminal of said signal receiving means and a first capacitor connecting the input terminal end of said first resistor to ground, and a second series resistor connected between said reference line and a second input terminal of said signal receiving means and a second capacitor connecting the input terminal end of said second resistor to ground.

7. The system of claim 1 including an intermediate lay between said inner and outer lays within said common shield, said intermediate and outer lays each including connections at each end to a direct voltage source, a voltage divider, a reference line connected to a reference voltage tap on said divider at each end, means for transmitting over other lines, and means for terminating said other lines in the characteristic impedance.

8. The system of claim 7 including a layer of insulation surrounding said shield, a strength member layer surrounding said insulation layer, and an outer layer of insulation surrounding said strength member layer.

* * * * *